(12) United States Patent
Cheng

(10) Patent No.: US 7,425,101 B2
(45) Date of Patent: Sep. 16, 2008

(54) IMAGE ADJUSTING ASSEMBLY FOR A MONITORING CAMERA

(76) Inventor: Yi-Jen Cheng, 9F, No. 21, Sec. 2, Chrongder 2 Rd., Taichung (TW)

( * ) Notice: Subject to any disclaimer, the term of this patent is extended or adjusted under 35 U.S.C. 154(b) by 361 days.

(21) Appl. No.: 11/441,475

(22) Filed: May 26, 2006

(65) Prior Publication Data
US 2007/0274706 A1    Nov. 29, 2007

(51) Int. Cl.
*G03B 17/00* (2006.01)
(52) U.S. Cl. .................. 396/427; 396/419; 348/143; 348/373
(58) Field of Classification Search ........... 396/427, 396/419; 348/373, 825, 143; D16/203; 206/316.1, 206/316.2; D8/373
See application file for complete search history.

(56) References Cited

U.S. PATENT DOCUMENTS

| | | | | |
|---|---|---|---|---|
| 5,028,997 A * | 7/1991 | Elberbaum | ............ | 348/143 |
| 5,181,120 A * | 1/1993 | Hickey et al. | ............ | 348/373 |
| 5,223,872 A * | 6/1993 | Stiepel et al. | ............ | 396/427 |
| 5,418,567 A * | 5/1995 | Boers et al. | ............ | 348/375 |
| 6,354,749 B1 * | 3/2002 | Pfaffenberger, II | ............ | 396/427 |
| 6,356,308 B1 * | 3/2002 | Hovanky | ............ | 348/373 |
| 6,476,856 B1 * | 11/2002 | Zantos | ............ | 348/151 |
| 6,860,654 B1 * | 3/2005 | Ching-Wen | ............ | 396/427 |
| 2007/0040930 A1 * | 2/2007 | Lee | ............ | 348/373 |
| 2007/0053681 A1 * | 3/2007 | Arbuckle | ............ | 396/427 |
| 2008/0056708 A1 * | 3/2008 | Kim | ............ | 396/427 |

* cited by examiner

*Primary Examiner*—W. B. Perkey
*Assistant Examiner*—Warren K Fenwick
(74) *Attorney, Agent, or Firm*—William E. Pelton, Esq.; Cooper & Dunham LLP

(57) ABSTRACT

An image adjusting assembly for a monitoring camera has a connecting frame, a rotating bracket and a fastener. The connecting frame is mounted around the camera bracket and is attached slidably to the positioning arms and has an upper connecting frame and a lower connecting frame. The upper connecting frame has two open ends and a curved channel. The lower connecting frame is connected to the upper connecting frame and has two open ends, a curved channel and a positioning board. The rotating bracket is connected to the connecting frame and the camera bracket and has multiple connecting boards, a rotating board and a through hole. The rotating board is mounted slidably in the curved channels of the connecting frame. The fastener extends through the positioning board and presses against the rotating board to hold the rotating bracket in place.

10 Claims, 6 Drawing Sheets

IMAGE ADJUSTING ASSEMBLY FOR A MONITORING CAMERA

BACKGROUND OF THE INVENTION

1. Field of the Invention

The present invention relates to an image adjusting assembly, and more particularly to an image adjusting assembly for a monitoring camera.

2. Description of Related Art

With reference to FIG. 6, conventional monitoring cameras (70) are used widely, are mounted on ceilings and usually have a base (71), an adjustable bracket (72), a camera bracket (73) and a cover (74). The base (71) is circular, is mounted on a ceiling and has a closed bottom, an open top and an internal space. The closed bottom of the base (71) is mounted against a ceiling. The open top of the base (71) faces away from the ceiling. The internal space is defined inside the base (71). The adjustable bracket (72) is mounted adjustably on and protrudes from the closed bottom of the base (71) and has a baseplate and two arms. The baseplate is attached rotatably to the closed bottom of the base (71) in the internal space and has an outer edge. The arms are flat, protrude perpendicular from the outer edge of the baseplate diametrically opposite to each other, are parallel and face each other, and each arm has a proximal end, a distal end and a curved slot (721). The proximal ends of the arms are formed on the outer edge of the baseplate. The distal ends of the arms extend through the open top of the base (71). The curved slots (721) are formed respectively through the distal ends of the arms. The camera bracket (73) is attached adjustably to the arms of the adjustable bracket (72) and has a front, a rear, two sides, a through hole, a connecting frame (731), two bolts and a camera lens (732). The through hole is formed through the front of the camera bracket (73). The bolts are attached to and protrude from the sides of the camera bracket (73), extend respectively through the curved slots (721) in the arms and pivotally attached the camera bracket (73) to the adjustable bracket (72). The connecting frame (731) is mounted in the rear of the camera bracket (73). The camera lens (732) is connected to the connecting frame (731) and extends through the through hole in the front of the camera bracket (73). The cover (74) is a transparent material, may be a dome and is mounted around and closes the open top of the base (71) to protect the camera lens (732) and the connecting frame (731).

With reference to FIG. 7, another conventional monitoring camera (80) has a base (81), an adjustable bracket (82), a camera bracket (83) and a cover (84). The structures of the base (81), the camera bracket (83) and a cover (84) of the conventional monitoring camera (80) are mostly same as the conventional monitoring cameras (70) as shown in FIG. 6. The adjustable bracket (82) is mounted adjustably on the base (81) and has a proximal end and a distal end. The proximal end of the adjustable bracket (82) is mounted rotatably on the close bottom of the base (81). The distal end of adjustable bracket (82) extends through the open top of the base (81). The camera bracket (83) is attached adjustably and rotatably to the adjustable bracket (82) with a bolt. With the bolt pressing against the camera bracket (83), the camera bracket (83) is held in place.

However, the conventional monitoring camera has the following shortcomings.

1. The first conventional monitoring camera (70) as shown in FIG. 6 can adjust the camera bracket (73) slidably along the curved slots (721) in the arms of the adjustable bracket (72), but cannot turn the camera bracket (73) to adjust the azimuth of the camera lens (732).

2. When the first conventional monitoring camera (70) as shown in FIG. 6 is mounted on a wall vertical to the ceiling, the image from the camera lens (732) is an upside down image and users have to restore the upside down image by taking apart and adjusting a circuit board of the connecting frame (731).

3. Users cannot use structural means to adjust the upside down image of the first conventional monitoring camera (70).

4. Although, the second conventional monitoring camera (80) in FIG. 7 can be rotated by loosening the bolt between the camera bracket (83) and the adjustable bracket (82), the holding effect provided by the bolt to the camera bracket (83) will be loosen due to the weight of the camera bracket (83) with the camera after a long time of use.

The image adjusting assembly for a monitoring camera in accordance with the present invention mitigates or obviates the aforementioned problems.

SUMMARY OF THE INVENTION

The main objective of the present invention is to provide an image adjusting assembly to directly turn a camera bracket of a monitoring camera to adjust an upside down image.

The image adjusting assembly for a monitoring camera has a connecting frame, a rotating bracket and a fastener. The connecting frame is mounted around the camera bracket and is attached slidably to the positioning arms and has an upper connecting frame and a lower connecting frame. The upper connecting frame has two open ends and a curved channel. The lower connecting frame is connected to the upper connecting frame and has two open ends, a curved channel and a positioning board. The rotating bracket is connected to the connecting frame and the camera bracket and comprises multiple connecting boards, a rotating board and a through hole. The rotating board is mounted slidably in the curved channels of the connecting frame. The fastener extends through the positioning board and presses against the rotating board to hold the rotating bracket in place.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
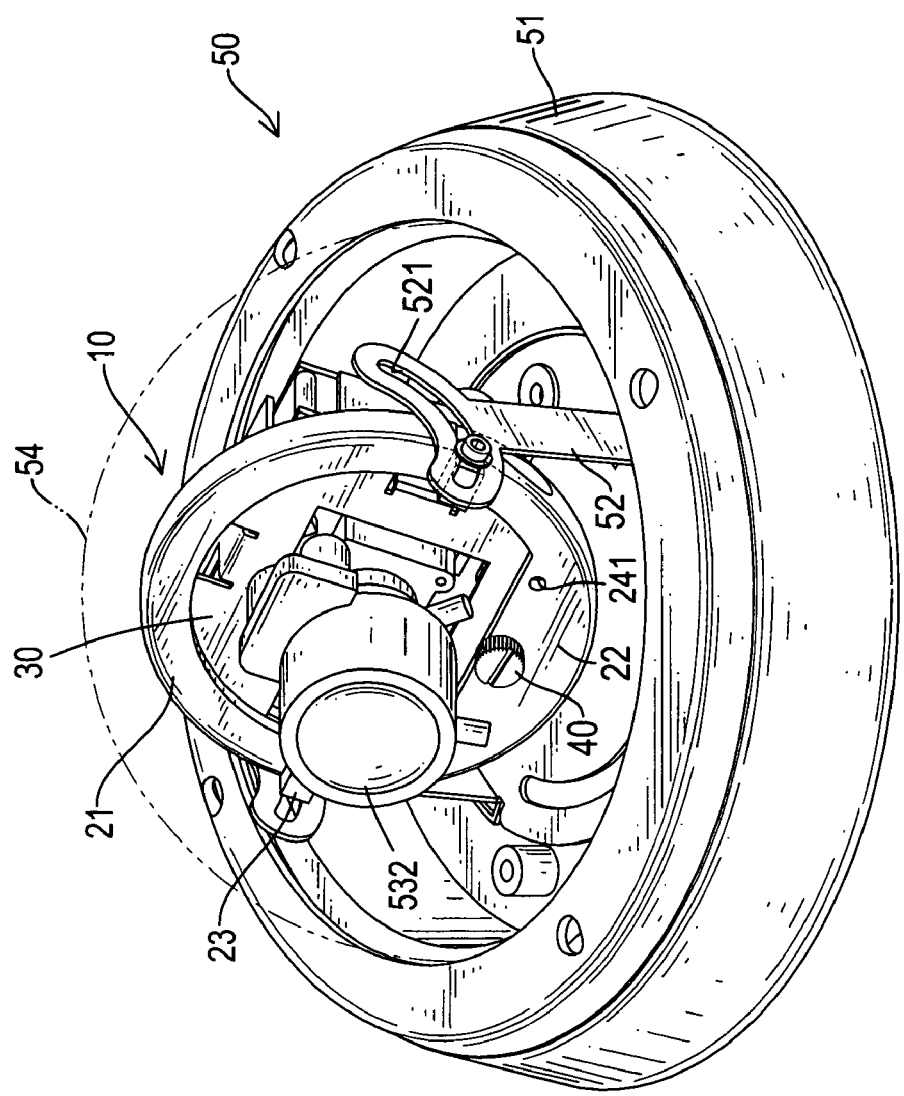
FIG. 1 is a perspective view of an image adjusting assembly for a monitoring camera in accordance with the present invention.
Figure 2:
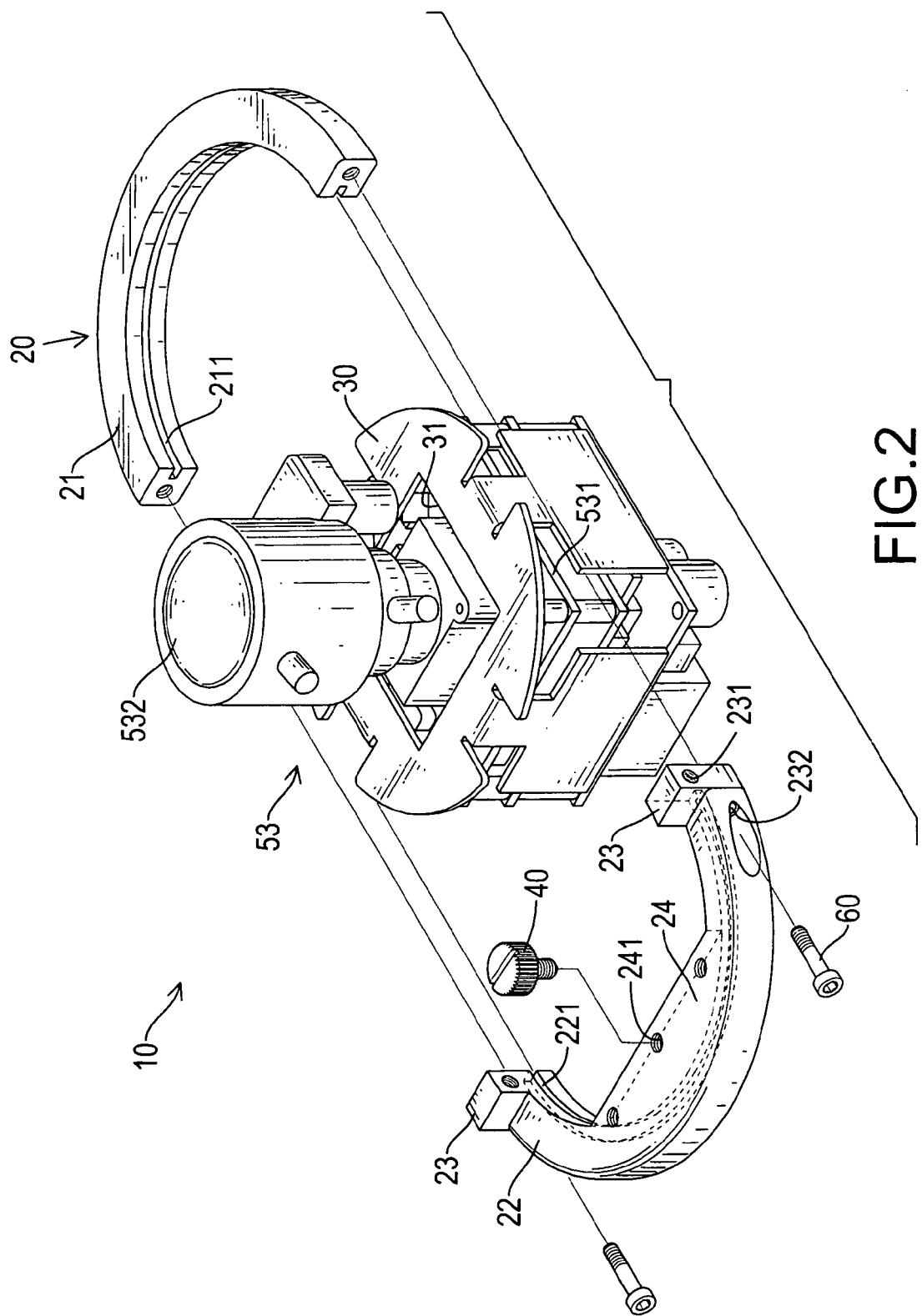
FIG. 2 is an exploded perspective view of part of the image adjusting assembly in FIG. 1.
Figure 5:
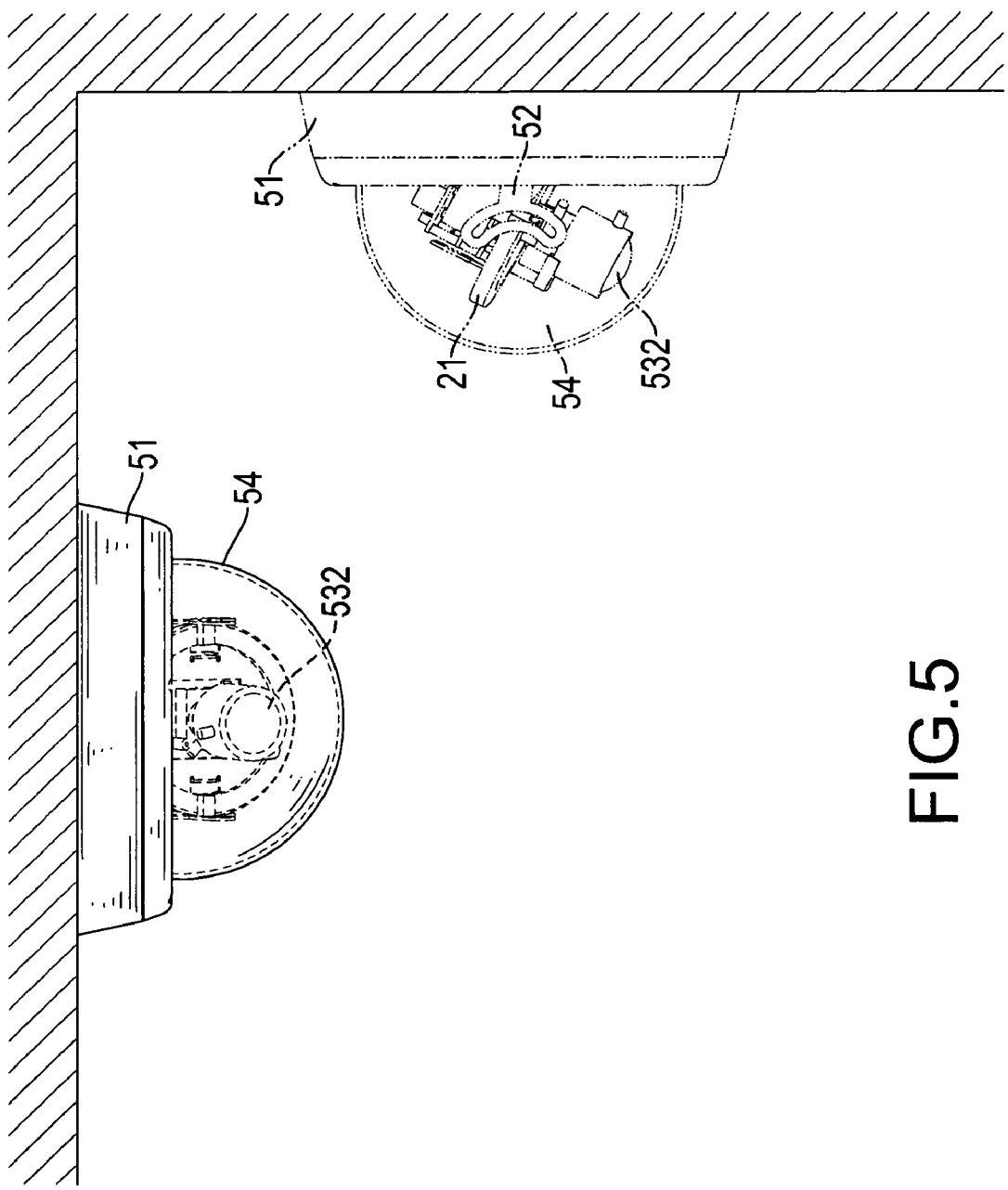
FIG. 5 is an operational perspective view of the image adjusting assembly mounted on a wall in FIG. 1.
Figure 6:
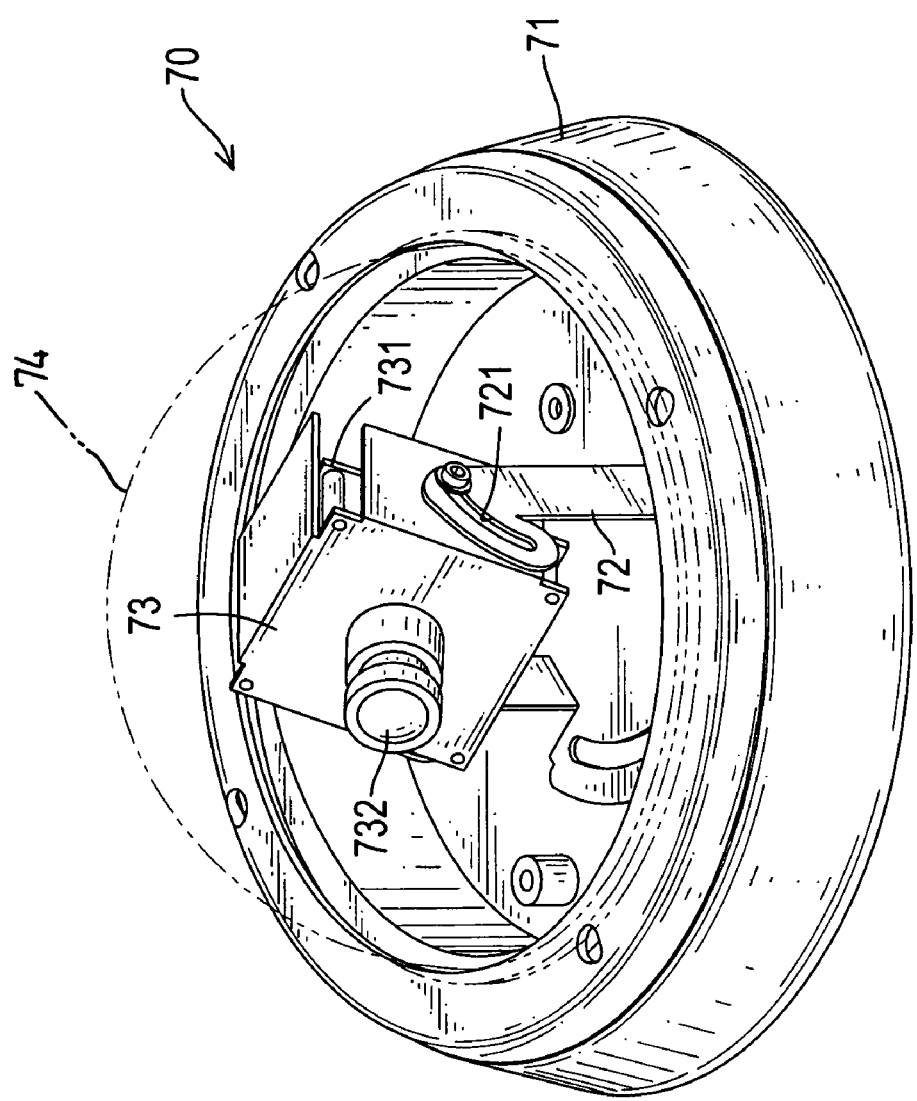
FIG. 6 is a perspective view of a conventional monitoring camera in accordance with the prior art.
Figure 7:
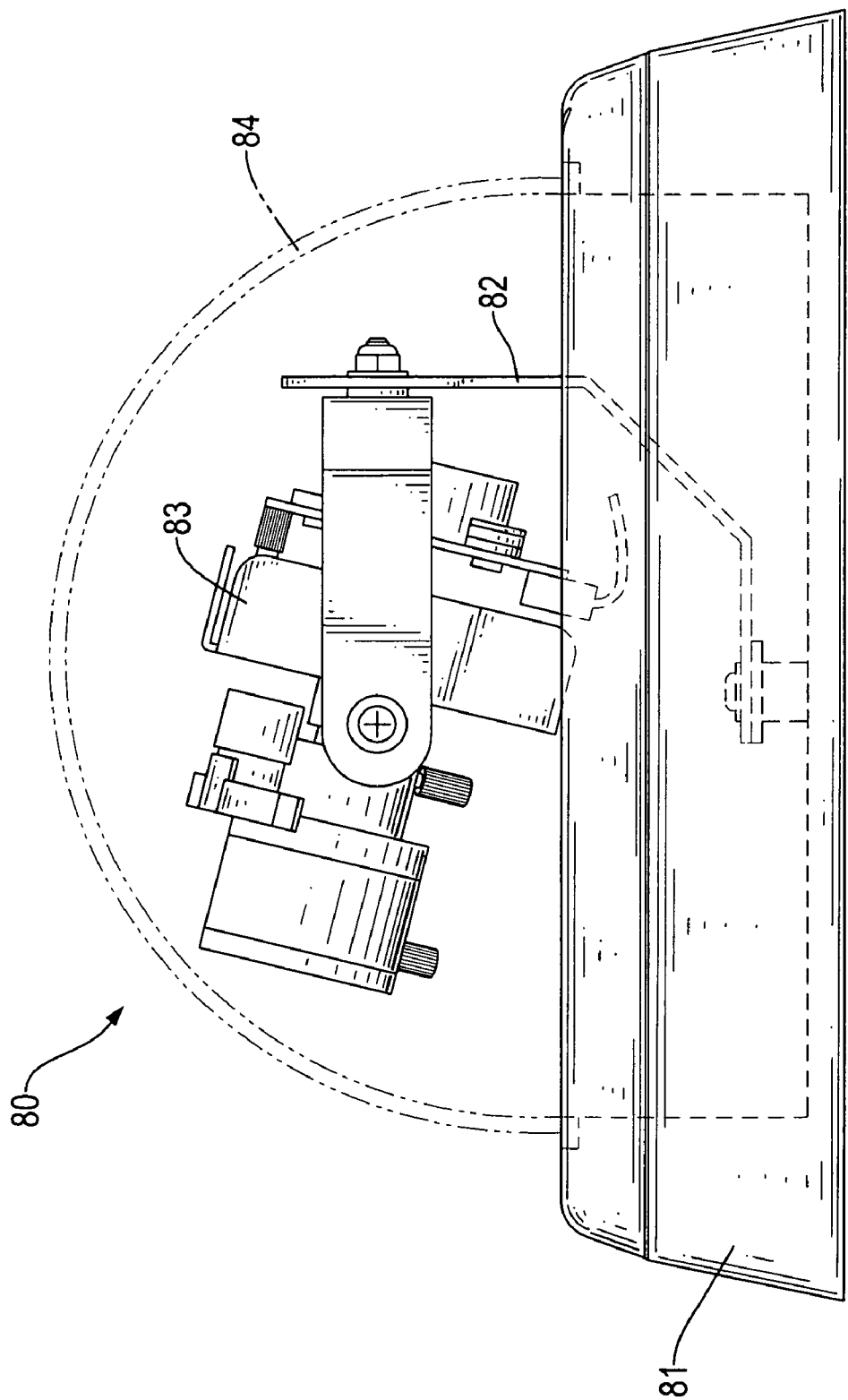
FIG. 7 is a side view of another conventional monitoring camera in accordance with the prior art.

With reference to FIGS. 1 and 2, an image adjusting assembly (10) in accordance with the present invention for a monitoring camera (50) having a base (51), an adjustment bracket, a camera bracket (53) and a cover (54) adjusts an upside down image. With further reference to FIG. 5, the base (51) is circular, is mounted on a ceiling or a wall and has a closed bottom end, an open top and an internal space. The closed bottom end of the base (51) is mounted against the ceiling or wall. The open end of the base (51) faces away from the ceiling or wall. The internal space is defined inside the base (51).

The adjustment bracket is mounted rotatably in the internal space against the closed bottom end of the base (51) and has a mounting base and two positioning arms (52). The mounting base is attached rotatably to the closed bottom of the base (51) in the internal space and has an outer edge. The positioning arms (52) are protruded perpendicular from the outer edge of the mounting base diametrically opposite to each other, are parallel and face each other, and each arm has a proximal end, a distal end and a curved slot (521). The proximal ends of the positioning arms (52) are formed on the outer edge of the mounting base of the adjustment bracket. The distal ends of the positioning arms (52) are extended out the open top of the base (51). The curved slots (521) are formed respectively through the distal ends of the positioning arms (52).

The camera bracket (53) is mounted between the positioning arms (52) and has a top, a bottom, a connecting frame (531) and a camera lens (532). The connecting frame (531) is mounted in the bottom of the camera bracket (53). The camera lens (532) is connected to the connecting frame (531) and protruded out the top of the camera bracket (53).

The lens cover (54) is a cover of translucent material and is mounted around the open top of the base (51) to protect the camera lens (532) and the connecting frame (531).

With further reference to FIG. 2, the image adjusting assembly (10) comprises a connecting frame (20), a rotating bracket (30) and a fastener (40).

The connecting frame (20) is mounted around the camera bracket (53) and is attached slidably to the positioning arms (52) and comprises an upper connecting frame (21) and a lower connecting frame (22).

The upper connecting frame (21) is semicircle-shaped and has two open ends, two optional threaded holes, an inner face and a curved channel (211). The threaded holes are respectively formed in the open ends of the upper connecting frame (21). The curved channel (211) is formed in the inner face of the upper connecting frame (21) from one open end to the other open end.

The lower connecting frame (22) is semicircle-shaped and is connected to the upper connecting frame (21), and has two open ends, two optional mounting blocks (23), an inner face, a curved channel (221) and a positioning board (24).

The mounting blocks (23) are respectively formed in the open ends of the lower connecting frame (22) and corresponding to the curved slots (521) in the positioning arms (52) and the open ends of the upper connecting frame (21), each has a mounting hole (231) and a through hole (232). The mounting holes (231) are respectively formed in the mounting blocks (23) and face respectively to the curved slots (521) in the positioning arms (52). The lower connecting frame (22) is connected slidably to the positioning arms (52) by bolts extending through the curved slots (521) and being screwed into the mounting holes (231). The through holes (232) are respectively formed through the mounting blocks (23) and aligns respectively with the threaded holes in the upper connecting frame (21). The lower connecting frame (22) is connected securely to the upper connecting frame (21) by bolts extending through the through holes (232) and being screwed into the threaded holes in the upper connecting frame (21).

The curved channel (221) is formed in the inner face of the lower connecting frame (22) from one open end to the other open end and corresponds to and communicates with the curved channel (211) of the upper connecting frame (21).

The positioning board (24) is semicircle-shaped and is formed in the inner face of the lower connecting frame (22) over the curved channel (221) between the open ends and has multiple positioning holes (241) and may be threaded holes. The multiple positioning holes (241) are arranged on the positioning board (24) in a line.

The rotating bracket (30) is connected to the connecting frame (20) and the camera bracket (53) and comprises multiple connecting boards (33), a rotating board (32) and a through hole (31). The connecting boards (33) are attached securely to the camera bracket (53) and cover around the circuit board (531). The rotating board (32) is mounted with the connecting boards (33) and is mounted slidably in the curved channels (211,221) in the upper connecting frame (21) and the lower connecting frame (22), and has a center. The through hole (31) is formed through the center of the rotating board (32). The camera lens (532) is extended out the rotating board (32) from the through hole (31).

The fastener (40) extends through one of the positioning holes (241) in the positioning board (24) and presses against the rotating board (32) to hold the rotating bracket (30) in place and may be a bolt.

Figure 3:
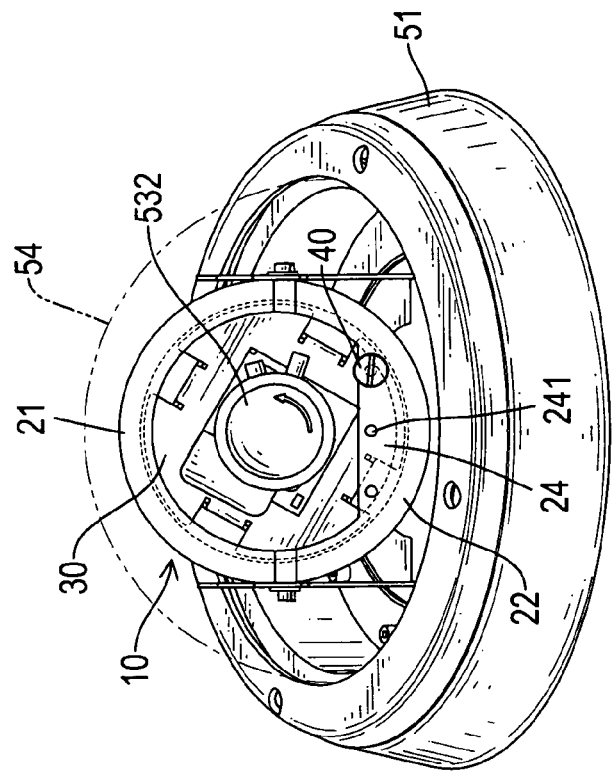
FIG. 3 is an operational perspective view of the image adjusting assembly with the monitoring camera in FIG. 1.
Figure 4:
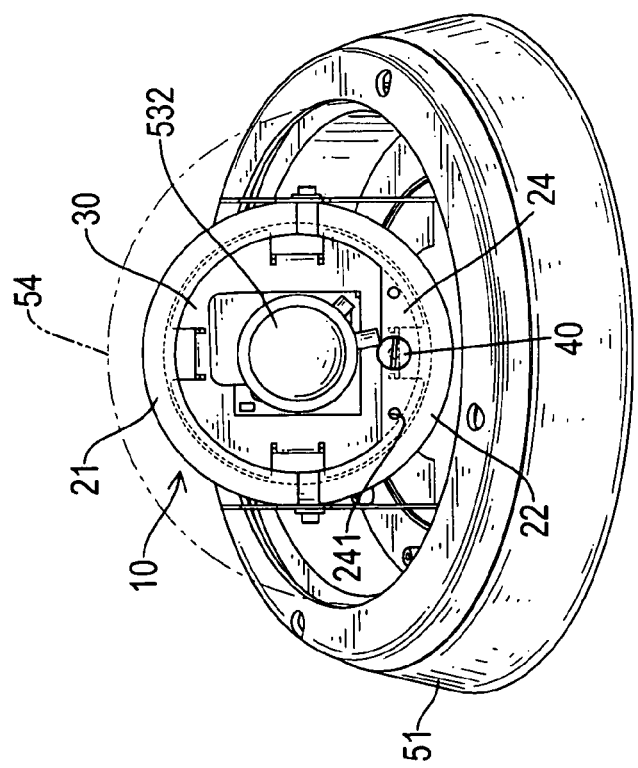
FIG. 4 is an operational perspective view of the image adjusting assembly with the monitoring camera in FIG. 1.

In operation, with reference to FIGS. 3 to 5, the rotating board (32) is slidably mounted between the upper connecting frame (21) and the lower connecting frame (22). Users can rotate the rotating board (32) relative to the connecting frame (20) with a angle 360° and hold the rotating board (32) in place by the fastener (40) to make the camera lens (532) rotating axially to adjust the upside down image directly.

The image adjusting assembly (10) as described has the following advantages.

1. The image adjusting assembly (10) for the monitoring camera (50) can adjust the connecting frame (20) slidably along the curved slots (521) of the positioning arms (52), and can return the rotating bracket (30) to adjust the image that shoot from the camera lens (532).

2. When the monitoring camera (50) is mounted on a wall that vertical to the ceiling of a building, the image shoot from the camera lens (532) may be an upside down image and users can adjust the upside down image easily by rotating the rotating bracket (30).

3. Users can adjust the upside down image of the monitoring camera (50) in a structural manner, so the monitoring camera (50) with an image adjusting assembly (10) can be used in widely varying environments.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A monitoring camera having
   a base having
      a closed bottom end;
      an open top; and
      an internal space defined inside the base;
   an adjustment bracket mounted rotatably in the internal space against the closed bottom end of the base and having a mounting base attached rotatably to the closed bottom of the base in the internal space and with an outer edge; and two positioning arms protruded perpendicular from the outer edge of the mounting base diametrically opposite to each other, parallel and facing with each other, and each positioning arm having
- a proximal end formed on the outer edge of the mounting base of the adjustment bracket;
- a distal end extended out from the open top of the base; and
- a curved slot defined through the distal end of the positioning arm;

a camera bracket mounted between the positioning arms and having
- a top;
- a bottom;
- a connecting frame mounted in the bottom; and
- a camera lens protruded out from the top;

a lens cover mounted around the open top of the base to protect the camera lens and the connecting frame; and an image adjusting assembly mounted in side the base and having
- a connecting frame mounted around the camera bracket and attached slidably to the positioning arms and having
  - an upper connecting frame having
    - two open ends;
    - an inner face; and
    - a curved channel formed in the inner face of the upper connecting frame from one open end to the other open end; and
  - a lower connecting frame being connected to the upper connecting frame and having
    - two open ends;
    - an inner face;
    - a curved channel being formed in the inner face of the lower connecting frame from one open end to the other open end and communicating to and corresponding to the curved channel of the upper connecting frame; and
    - a positioning board being formed in the inner face of the lower connecting frame over the curved channel between the open ends and having multiple positioning holes;
- a rotating bracket connected to the connecting frame and the camera bracket and having
  - multiple connecting boards attached securely to the camera bracket and covering around the circuit board;
  - a rotating board being mounted with the connecting boards and mounted slidably in the curved channels in the upper connecting frame and the lower connecting frame and having a center; and
  - a through hole formed through the center of the rotating board and the camera lens extending out from the rotating board through the through hole; and
- a fastener extending through one of the positioning holes in the positioning board and pressing against the rotating board to hold the rotating bracket in place.

2. The monitoring camera as claimed in claim 1, wherein the upper connecting frame further has
   two threaded holes respectively formed in the open ends of the upper connecting frame; and
the lower connecting frame further has
   two mounting blocks respectively formed in the open ends of the lower connecting frame and corresponding to the curved slots in the positioning arms and the open ends of the upper connecting frame, each having
   - a mounting hole formed in the mounting block and corresponding to the curved slot in a corresponding one of the positioning pawls; and
   - a through hole formed through the mounting block and aligning with one of the thread holes in the upper connecting frame.

3. The monitoring camera as claimed in claim 2, wherein the upper connecting frame and the lower connecting frame are semicircle-shaped.

4. The monitoring camera as claimed in claim 3, wherein the positioning board is semicircle-shaped.

5. The monitoring camera as claimed in claim 4, wherein the multiple positioning holes are arranged on the positioning board in a line.

6. The monitoring camera as claimed in claim 5, wherein the fastener is a bolt and the positioning holes are threaded holes.

7. The monitoring camera as claimed in claim 1, wherein the upper connecting frame and the lower connecting frame are semicircle-shaped.

8. The monitoring camera as claimed in claim 1, wherein the positioning board is semicircle-shaped.

9. The monitoring camera as claimed in claim 1, wherein the multiple positioning holes are arranged on the positioning board in a line.

10. The monitoring camera as claimed in claim 1, wherein the fastener is a bolt and the positioning holes are threaded holes.

* * * * *